United States Patent

[11] 3,589,647

| [72] | Inventor | John E. Burkham<br>Media, Pa. |
|---|---|---|
| [21] | Appl. No. | 886,714 |
| [22] | Filed | Dec. 19, 1969 |
| [45] | Patented | June 29, 1971 |
| [73] | Assignee | The Boeing Company<br>Seattle, Wash. |

[54] ANTITORQUE AND PROPULSION ROTOR
8 Claims, 7 Drawing Figs.

[52] U.S. Cl. .................................................. 244/17.21,
416/123
[51] Int. Cl. ...................................................... B64c 27/82
[50] Field of Search ........................................... 244/17.19,
17.21, 17.23, 17.11, 6, 7; 416/123, 120, 121, 89,
147

[56] References Cited
UNITED STATES PATENTS
2,788,075   4/1957   Pullin et al. ................... 244/17.19
FOREIGN PATENTS
549,073   11/1942   Great Britain ................ 416/123

Primary Examiner—Milton Buchler
Assistant Examiner—Paul E. Sauberer
Attorneys—Albert W. Hilburger, John D. Fischer and Joseph M. Corr ABSTRACT: A combined antitorque and propulsion rotor for use in vertical lift aircraft of the helicopter type, such as compound helicopters or convertiplanes. The rotor comprises coned, rigid blades preferably inclined at a cone angle of between 45° and 60° with respect to the longitudinal axis of the aircraft. Collective and cyclic pitch means are provided for varying the pitch of the blades and consequently varying the thrust, antitorque and lifting forces exerted by the rotor on the aircraft.

PATENTED JUN29 1971

INVENTOR:
JOHN E. BURKAM,
BY Joseph M. Corr
ATTORNEY

INVENTOR:
JOHN E. BURKAM,
BY Joseph M. Corr
ATTORNEY

INVENTOR:
JOHN E. BURKAM,
BY Joseph M. Corr
ATTORNEY

ANTITORQUE AND PROPULSION ROTOR

BACKGROUND OF THE INVENTION

This invention relates generally to vertical lift aircraft such as helicopters. In particular, this invention relates to those types of aircraft referred to as compound helicopters or convertiplanes, wherein forward thrust is achieved with the use of a propeller attached to the rear of the craft. Speaking more particularly, the invention relates to a helicopter having a rear-mounted rotor which is adapted to provide both antitorque and propulsive forces either alone or in combination.

In a conventional single rotor helicopter the lift and forward drive are provided by the main rotor. A smaller tail rotor is attached to the rear of the aircraft in order to provide antitorque forces. Forward thrust is applied to the craft by tilting the main rotor in the forward direction and applying the proper pitch controls. Since the main rotor is the only source of forward thrust, the helicopter maximum speed is limited to the speed at which the rotor experiences the well-known phenomenon of retreating blade tip stall. If a higher speed is desired, it is necessary to provide an additional source of propulsion to augment the thrust of the main rotor.

Various approaches have been attempted in the past to adapt a propeller to a helicopter which can supply a thrust to the aircraft and which has associated means for providing the antitorque and directional forces of the conventional rear rotor. One approach involves mounting a rigid propeller on the rear of the aircraft and providing such things as shrouds and directional turning vanes with the propeller to control the vectorial components of the forces exerted by the propeller. Thus, by changing the direction of the vanes, the forward thrust and antitorque forces can be varied. The use of these extra components resulted in the disadvantages of increased weight and complexity of the aircraft as well as high vibration amplitudes. Also, a completely antitorque mode cannot be achieved using the approach and a forward thrust component is present even when the helicopter is hovering. In order to combat this forward thrust, the main rotor must be tilted to provide a counteracting rearward thrust.

Another approach using a rear rotor for propulsion has been to provide a swivel-type rotor wherein the rotor axis is in line with the longitudinal axis of the aircraft for propulsion, but for antitorque the rotor is swiveled so that its axis is perpendicular to the longitudinal axis of the craft. This ability to be switched from one position to another increases the mechanical complexity of the rotor as well as the dynamic forces on the craft while the rotor is being swiveled from one position to another. The purpose of this swivel-type rotor naturally is to provide the ability to change the mode of the rear rotor from propulsion to antitorque, however, the mechanical and aerodynamic problems inherent in such a construction render this approach as questionably practical.

Another attempt to provide a rear rotor which can assume propulsion and antitorque modes involves using a universally mounted rotor with a longitudinal axis of rotation and with the blades rotating in a vertical plane. Control means are built in to vary the collective and cyclic pitch of the rotor blades. The main drawback of this rotor is that a completely antitorque and side thrust mode cannot be achieved since the ability to tilt the rotor and pitch the blades is limited so that a forward thrust component is always present. Therefore, for example, when the helicopter is hovering, the main rotor has to be tilted so as to provide a rearward thrust to counteract the rear rotor forward thrust component. The presence of such a forward thrust component increases the control problems which the pilot must face in hovering and is undesirable.

With the foregoing disadvantages in mind, this invention was directed to provide a combined antitorque and propulsion rotor which is relatively inexpensive and provides excellent flexibility in increasing the maneuverability of the aircraft from hovering through forward flight.

SUMMARY OF THE INVENTION

It is therefore an object of the invention to provide a combined antitorque and propulsion rotor which will overcome the disadvantages and shortcomings of prior rotors of this type and will increase the maneuverability of the aircraft. In addition, it is an object of the invention to have a rotor which is relatively inexpensive and simple in manufacture.

It is an additional object of this invention to provide such a combined rear rotor which need not be swiveled, rotated or tilted in going from acting as an antitorque rotor to acting as a propulsion rotor. This naturally avoids complications and expense which would arise if means for imparting such motions to the rotor were necessary.

The purpose of the invention is to provide a greatly improved rear rotor for helicopter aircraft, such as compound helicopters and convertiplanes, wherein the rotor blades are positioned at a predetermined angle with respect to the fuselage longitudinal axis and may be cyclically and collectively pitched to alternate between forward trust, antitorque and combined modes. The rotor of this invention, therefore, provides excellent second means for providing forward thrust to the aircraft while not sacrificing the important antitorque forces necessary in aircraft of this type.

Another object is to provide a rear rotor for a helicopter which is adapted to function as a conventional rear rotor as well as to supply propulsive forces, wherein the rotor blades are inclined at a selected cone angle with respect to the longitudinal axis of the helicopter fuselage and wherein means are provided for varying the cone angle throughout a range of angles.

With the particular design of the rotor of this invention, it is not necessary to provide a shroud or turning vane in association with the rotor in order to aid it in passing from antitorque to thrust modes. Again, this reduces the complexity as well as the expense and weight of the rear rotor mechanism.

These and other objects are accomplished by this invention wherein the particular rotor provided comprises fixed blades which are inclined at a predetermined cone angle with respect to the longitudinal axis of the aircraft fuselage. In addition, means are provided for collectively and cyclically pitching the coned blades wherein the thrust and antitorque forces can be varied from essentially the complete antitorque mode through to the essentially complete thrust mode and vice versa and wherein lifting forces can be provided. Means may also be incorporated in the rotor for varying the cone angle of the blades. Other objects and advantages of this invention will be more readily apparent from the detailed description and the claims which follow.

DESCRIPTION OF THE PREFERRED EMBODIMENTS

Although a specific embodiment will be described herein, it is to be understood that the invention is not limited thereto but can be equally applied to other aircraft configurations. It should also be noted that throughout the description the term "helicopter" oftentimes will be used in reference to the aircraft. However, this is to be construed as a broad term and encompasses a broad range of vertical lift aircraft which have characteristics of a helicopter. Additionally, modifications to the specific rear rotor described will be readily apparent to those skilled in the art and are clearly within the scope of this invention.

Figure 1:
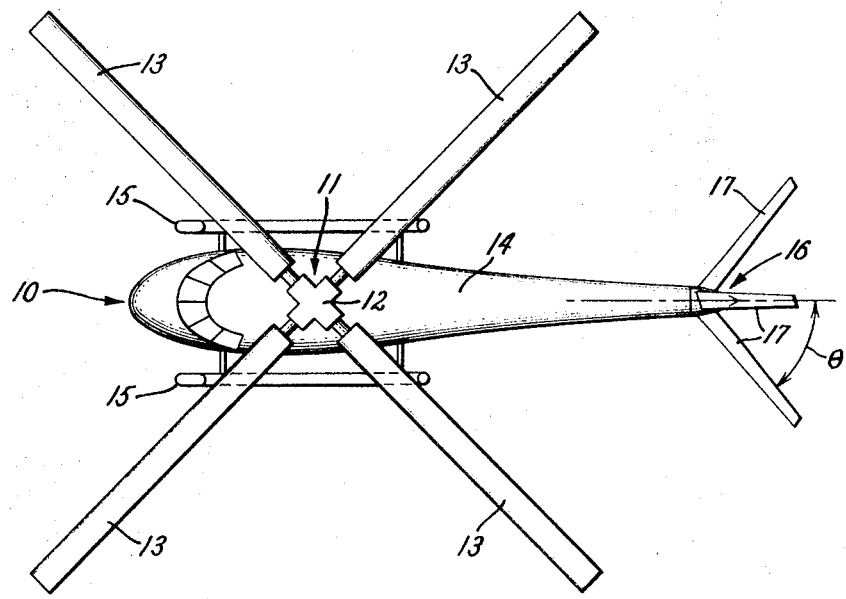
FIG. 1 is a schematic drawing of a helicopter having a rotor of this invention mounted at the rear.

Referring now to FIG. 1 there is shown a schematic drawing of the helicopter generally designated as 10 with a main rotor 11 having a hub 12 and blades 13. This main rotor is a conventional one normally used in single rotor helicopters. In line with what was stated above, it is to be understood that a helicopter of this invention may have more than one rotor depending on the aircraft size. Because the rotor 11 is a conventional one, the engine, drive means and control means have not been shown and the details thereof form no part of the invention. The main rotor, of course, is used for giving lift to the aircraft and may also be rotated and pitched to provide forward, rearward or lateral thrust. However, in practice, since forward thrust will be primarily provided by the rear rotor, the main rotor may be controlled in pitch to an angle which reduces its drag to a minimum while providing the necessary lift. If other means are provided for supplying lift, the main rotor may be disengaged and be permitted to rotate freely but in a manner whereby it exerts the minimum drag possible. Also, the fuselage 14 is shown generally in the shape of a conventional helicopter while landing pontoons or skids 15 are provided in the normal manner.

Located at the rear of the aircraft is the rear rotor 16 having blades 17 established at a cone angle $\theta$ with respect to the fuselage longitudinal axis shown in dashed lines as the centerline of the helicopter. It should be noted here that it is common practice to measure the cone angle with respect to the axis of rotation, or with respect to a plane perpendicular to the axis of rotation. In the embodiment described herein, the axis of rotation is in line with the longitudinal axis, or centerline, of the helicopter fuselage. For purposes of discussion, therefore, the cone angle $\theta$ will be measured with respect to the fuselage longitudinal axis, it being clearly understood that one could easily calculate the angle with respect to another suitable reference, such as a plane perpendicular to the axis of rotation, and obtain preferred ranges of angles corresponding to those discussed herein.

A suitable range for the angle $\theta$ is from 30° to 70° for the reason that if the angle is less than 30° there is loss in forward thrust component and if it is greater than 70° there is a loss in the antitorque force. In particular, the range of angles of 45° to 60° is preferred with 50° being the angle preferably used.

Figure 4:
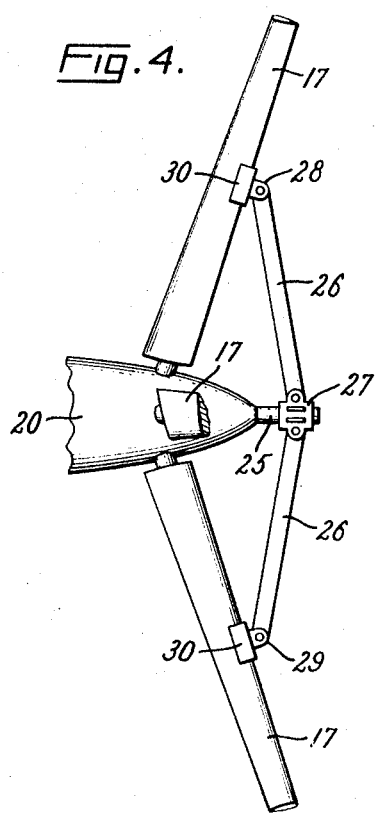
FIGS. 4 and 4a are top plan views of the rotor illustrating a mechanism for varying the blade cone angle.
Figure 4A:
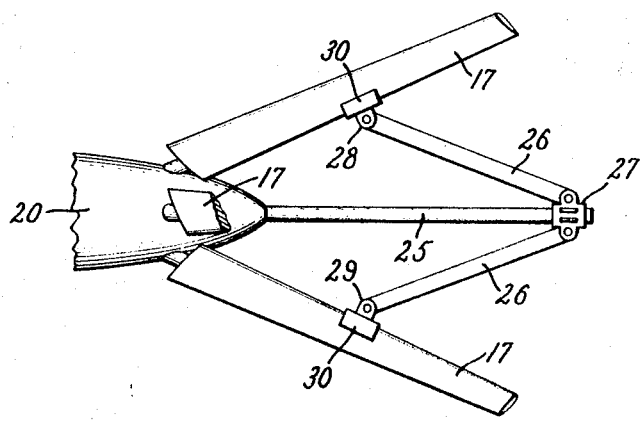

The angle $\theta$ may be permanently preset or mechanical and/or electrical means can be provided to vary the angle as desired. A mechanism which can be used to vary the cone angle $\theta$ is illustrated in FIGS. 4 and 4a and will be more fully discussed later. Since this is a single rotor helicopter the conventional means of attaching the rear rotor to a drive shaft leading from the engine to the tail can be used for supplying power to the rotor. In addition, a swashplate can be provided together with various control couplings and levers for varying the pitch of the rear rotor.

When a cyclic pitch is applied to the rear rotor, there occur cyclic flap bending moments at proper timing to cause a yawing moment to be exerted on the aircraft via the drive shaft which tends to turn the aircraft about a vertical axis. Since the yaw moment and side force must act together in maintaining directional control of the aircraft, it is necessary that this rear rotor be in back of the center of gravity of the aircraft and preferably be at the tail as shown in the Figure. Of course, if another design of the aircraft is used, it is conceivable that the rotor can be located at another point and in addition more than one rotor could be used. The details of the rear rotor can be better understood by referring to the other Figures.

Figure 2:
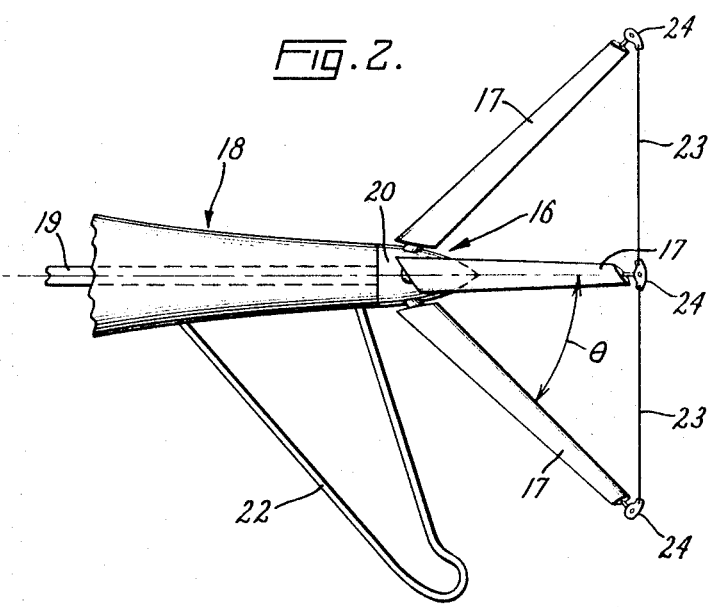
FIG. 2 is a closeup side view of the rear rotor.

Therefore, in FIG. 2 there is a closeup side view of the tail section 18 of the helicopter of FIG. 1 showing the rear rotor 16 in larger detail. The drive shaft which connects the rear rotor to the engine appears at 19 and the spinner over the rotor hub and control mechanism is numbered 20. As stated previously, the blades are inclined at a cone angle $\theta$ with respect to the centerline or longitudinal axis of the aircraft fuselage which appears in phantom lines. In this particular Figure the angle $\theta$ is approximately 50° and this is the preferred angle. The blades 17 are shown as being generally rectangular in shape although they could be tapered if desired. In addition, the blades should be slightly twisted in order to provide a more uniform angle of attack along the length of the blade. A tail resting skid is depicted at 22.

The blades can be made according to conventional manufacturing methods and using materials such as steel tubes, boron or carbon filaments. In some instances the centrifugal flap-bending moments may be sufficiently large so that it is necessary for them to be corrected by some type of radial or tangential braces between blade tips. To illustrate one method of tangentially bracing the blades guy wires 23 are shown anchored in the blade tips. The wires are thin enough so as not to add aerodynamic complications and are fastened by anchors 24 along the pitch axis so as not to interfere with the pitch of the blades. Other methods for tangentially bracing the blades, if necessary, are apparent to those skilled in the art. A fourth blade of the rotor is not visible in the Figure and it has guy wires coupling it to the two end blades.

The preferred range of the coning angle $\theta$ is based on three considerations: the propulsive efficiency of the rotor is a function of the sine of the coning angle; the side force exerted by the rotor is a function of the cosine of the angle times the sine squared of the angle; and, finally, the yawing moment which aids the side force is a function of the sine squared of the cone angle. With these considerations in mind, therefore, it is found that the preferred range of angles is from approximately 45° to 60° while 50° is the most suitable angle for satisfying the three considerations outlined above. Of course, it is not intended that the invention be limited to the particular angle or range of angles described above, but rather these angles are preferred in order to achieve the best rotor efficiency.

Figure 3A:
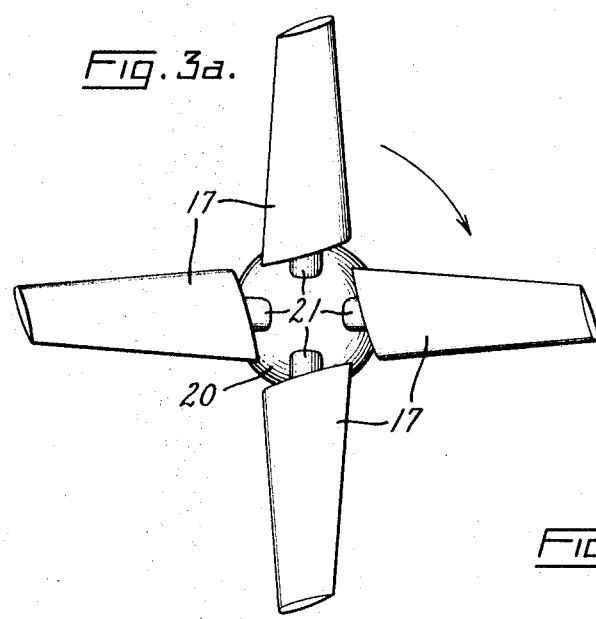
FIG. 3a is a rear view of the rotor illustrating the blade pitch for forward thrust mode.

Referring now to FIG. 3a, there is shown a rear view of the rotor of this invention with the blades 17 pitched for forward propulsion mode. With the suitable collective pitch of the blades a reverse thrust mode of the rotor could be achieved, but for purposes of discussion the forward thrust mode will be illustrated. The preferred rotor has four blades as shown in this Figure although in FIGS. 1 and 2 the fourth blade does not appear. The blades are shown with the proper pitch orientation drawn to give a perspective of the pitch of the blades at each 90° rotational position. The arrow indicates the direction of rotation. Again, the blades are initially set at a cone angle $\theta$ of approximately 50° with respect to the longitudinal axis of the fuselage. The pilot has induced a collective pitch on the four rotor blades so that the blades are drawing air through the rotor disc for propulsion. As shown by the inclination of the blades at their tips and roots, the blades are all equally pitched in a positive angle of incidence so that each blade has the same angle of incidence throughout a revolution.

As was mentioned previously, it is preferred to have four blades on the rotor, however, according to the specific design requirements of the aircraft being used this number of blades can be varied. When the blades are in the propulsion mode the rear rotor is supplying the main forward thrust to the aircraft and, as mentioned previously, the main rotor can be pitched to rotate with minimum drag while providing the proper lift. Of course, this rotor need not be the sole means of forward thrust but rather may be used to aid either the main rotor or the other rotors provided on the aircraft in supplying the propulsion.

In FIG. 3b the rear rotor may again be viewed from the rear wherein, in this instance, the blades have been pitched in a manner to provide antitorque force only. The arrow indicates the direction of rotation of the blades 17. For the antitorque mode, no collective pitch is placed on the blades and as shown by the Figure, the rotor has been cyclically pitched so that as the rotor blades rotate they pass through varying angles of incidence. The blades are shown at the four radial positions having the angles of incidence which each assumes in passing through one complete revolution. Thus, beginning with the blade in the twelve o'clock position and passing through one complete clockwise revolution, the blades assume the following angles of incidence: neutral, positive, neutral, negative. This cyclic pitch applied to the blades results in a substantially completely antitorque or side force only which is used in hovering, vertical lifting or in effecting a rotation of the craft about the vertical axis through the helicopter's center of gravity. Thus, the mode of the rear rotor counteracts the yawing moment produced by the torque exerted by the rotating main rotor. In this manner, therefore, the rear rotor is adapted to function as a conventional tail rotor mounted on the side of the tail of a conventional single rotor helicopter. The cyclic pitch can be provided by a swashplate or other suitable mechanism which is not shown in the Figure.

Figure 3B:
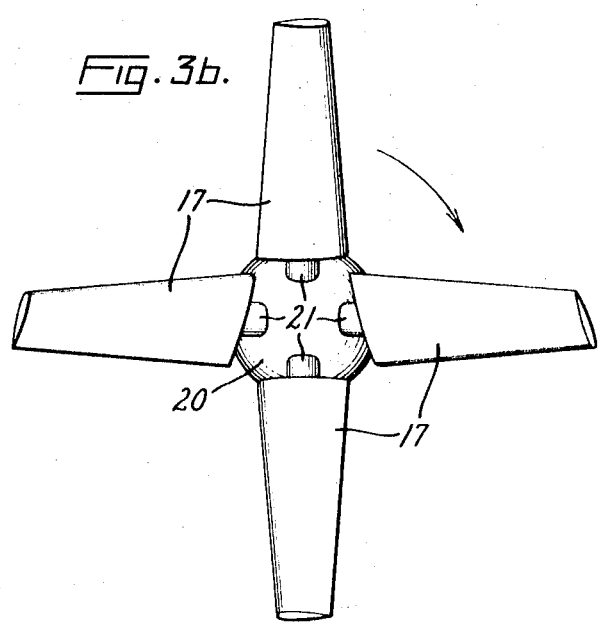
FIG. 3b is a rear view of the rotor illustrating the blade pitch for antitorque mode.
Figure 3C:
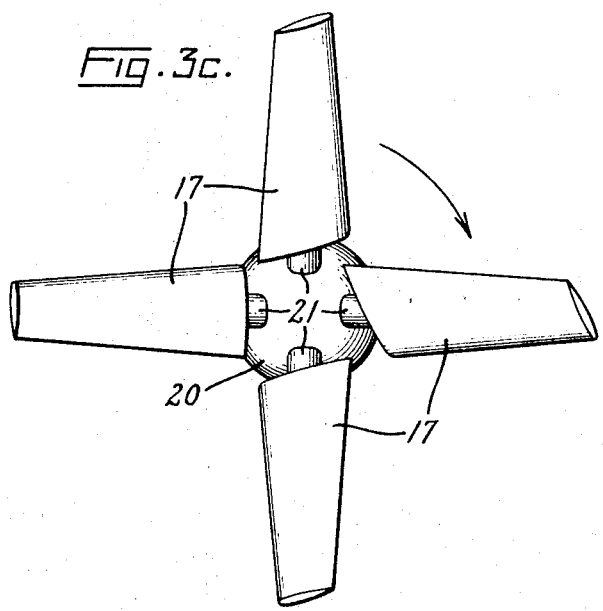
FIG. 3c is a rear view of the rotor illustrating the blade pitch for combined forward thrust and antitorque mode.

In FIG. 3c the rear rotor blades 17 have been collectively and cyclically pitched to provide a combination forward thrust and antitorque mode. The amount of either type of pitch is determined by the amount of propulsion, side force and speed desired and the pitch illustrated in the Figure is for a particular combined forward thrust and side force. This mode, therefore, can be used in those instances where the rear rotor is aiding the propulsion of the helicopter while also counteracting the yawing moment and torque forces exerted on the helicopter by the main rotor. In the manner of FIGS. 3a and 3b, the blades are again shown having the angles of incidence at each 90° station on the rotor disc periphery for supplying the combined antitorque and forward thrust mode. Starting with the blade in the twelve o'clock position and reading clockwise the blades pass through the following angles of incidence at the four positions shown in the Figure: positive, more positive, positive, neutral. In this instance, the cyclic pitch applied to the blades causes the angle of incidence to be positive initially at the twelve o'clock position and to increase in angle or to go more positive, in the first quadrant of the rotor disc and to return to the initial positive angle of incidence at the 180° point. At the 270° point the blade is feathered, i.e. it has a neutral angle of incidence. With the blades pitched in the manner described the rotor is capable of propelling the aircraft while performing like a conventional tail rotor in supplying antitorque forces.

The situation illustrated in FIG. 3c is an aerodynamically complex one as can be evident from considering the variety of forces acting on the helicopter during the period when it is passing from forward flight to hovering. As a result of the design of the rear rotor with its coned blades, which can be collectively and cyclically pitched, the rotor can provide the proper counteracting forces to permit the transition between flight and hovering modes. As a result, the rear rotor is particularly adaptable to use on helicopters referred to as compound helicopters or convertiplanes.

Shown in FIGS. 3a, 3b and 3c is the cone-shaped spinner 20 which covers the hub and control mechanisms associated with the rear rotor. Also, shown passing into the spinner 20 for connection to the hub are the roots 21 of the blades 17. As stated previously, much of the mechanical assembly of the rear rotor is conventional and the details of the connection of the blades to the hub are not given. The cone-shaped spinner serves the purposes of streamlining and protecting the hub assembly and is shaped to provide an aerodynamically smooth profile to the helicopter tail. The tangential bracing illustrated in FIG. 2 was not included in FIGS. 3a, 3b and 3c in order to permit easier visibility of the blade pitch. In addition, separate Figures to illustrate the blade pitch for lifting modes have not been included since these modes can readily be described by referring to FIGS. 3b and 3c.

By initially rotating the blades in FIG. 3b 90° in the counterclockwise direction, the blades would be cyclically pitched so that beginning at the twelve o'clock position and reading clockwise the blades would assume the following angles of incidence: positive, neutral, negative, neutral. This particular cyclic pitch, when applied to the blades enables the rear rotor to give a vertical or lifting force to the helicopter in conjunction with a pitching moment. Because the rear rotor can operate in this mode, it is possible to simplify the main rotor controls by eliminating the longitudinal cyclic pitch or it can augment the main rotor pitch control where the latter is not as powerful as desired, e.g. to increase the range of permissible longitudinal center of gravity location. An initial counter rotation of 45° of the blades in FIG. 3b will establish the proper pitch for a combined lifting and antitorque mode.

In a similar manner, if the blades in FIG. 3c are initially rotated 90° counterclockwise and then observed reading clockwise beginning at the twelve o'clock position, the blades would sequentially pass through the following angles of incidence: more positive, positive, neutral, positive. This particular cyclic pitch of the blades enables the rear rotor to supply a combined lifting and propulsion force together with a pitching moment.

In FIGS. 4 and 4a, there is shown a mechanism for varying the cone angle $\theta$ of the blades 17. The Figure is a top plan view of the rear rotor with one blade broken away to show the mechanism attached to two blades. The mechanism comprises a shaft 25 with rods 26 universally coupled to the shaft at its end 27. The rods extend radially outward and each one is universally coupled to a blade such as shown at 28 and 29. The universal coupling is necessary to prevent interference with the blade movements such as pitching of the blades. The anchor plate 30 for the coupling to each blade is connected to the blade spar for structural strength.

The shaft is free to extend and retract and thereby pass out and into an opening in the spinner 20. Mechanical controls for extending and retracting the rod can be easily provided so that the blades can be pulled inward and pushed outward in umbrella fashion. In addition, the shaft and rods provide radial bracing of the blades and can be used in lieu of the guy wires shown in FIG. 2, if such bracing is required.

In FIG. 4, the shaft has been retracted causing the rods to push the blades outward to approximately the maximum angle $\theta$ of 70°. FIG. 4a depicts the extended position of the shaft so that the rods have pulled the blades inward to approximately a $\theta$ angle of 30°. Intermediate positions corresponding to different cone angles can be assumed by this mechanism which can be locked in position by a suitable locking means incorporated in the mechanical controls.

What has been described herein is a specific embodiment of this invention which illustrates the uniqueness of the tail rotor having coned blades wherein the rotor is capable of operating in a variety of modes including forward thrust, rearward thrust, antitorque and combined forward or rearward thrust and antitorque. The invention is not limited to the specific embodiment shown and can be used in different helicopter configurations.

What I claim is:

1. In a helicopter, a tail rotor for supplying antitorque and propulsive thrust forces, said rotor comprising a hub and a plurality of blades attached thereto and inclined at a selected cone angle with respect to the axis of rotation of said rotor, means for varying the cone angle at which said blades are inclined with respect to the axis of rotation, drive means operatively associated with said rotor for driving same, and pitch means in operative association with said rotor and capable of varying the collective and cyclic pitch of said blades to enable said rotor to assume various operative modes including a propulsive mode, an antitorque mode, a lifting mode, and modes which are combinations thereof.

2. The rotor of claim 1 wherein said cone angle is between about 30° and 70° with respect to the axis of rotation.

3. The rotor of claim 1 wherein reinforcing bracing means are incorporated in said blades in order to oppose centrifugal flap bending moments in the blades which may occur during rotation of said blades.

4. A hingeless tail rotor for use in a vertical lift aircraft comprising a hub and a plurality of blades connected to said hub, a drive means connecting said hub to an engine of said aircraft, pitch means for inducing collective and cyclic pitch on said rotor blades, said blades being mounted on said hub in a manner wherein said blades form a cone angle of between 30° and 70° with respect to the rotor axis of rotation, means for varying said cone angle within said range of 30° to 70° with respect to the rotor axis of rotation, each blade being twisted along its longitudinal axis to establish a relatively uniform angle of attack of the blade and said rotor, when having the proper pitch induced thereon, being capable of operating in one of a plurality of modes including an antitorque mode, a propulsive mode, a lifting mode, a combined antitorque and propulsive mode, and a combined lifting and antitorque mode.

5. A tail rotor mountable to the tail section of a single main rotor helicopter having an engine and a drive shaft extending from said engine to said tail section, said rotor comprising a hub and a plurality of blades attached to said hub and adapted to rotate therewith, said hub being adapted for operative connection to said drive shaft and being driven thereby, each of said blades forming a cone angle with respect to the rotor axis of rotation, said cone angle being in the range from about 30° to 70°, means for varying said cone angle within said range of 30° to 70° with respect to the rotor axis of rotation, pitch means for inducing collective and cyclic pitch on said blades to enable said rotor to operate in any one of a variety of modes including an antitorque mode to counteract the torque of the main rotor exerted on said helicopter, a propulsive mode for supplying forward thrust to said helicopter, a lifting mode, and modes which are combinations thereof.

6. The rotor of claim 1, wherein said means for varying said cone angle comprises a shaft capable of extending and retracting out of and into said tail section, a plurality of rods universally coupled to said shaft at one end, each rod being universally coupled to a blade at its other end whereby extension and retraction of said shaft causes said blades to be inclined at different angles with respect to said axis of rotation.

7. The rotor of claim 5 wherein reinforcing bracing means are incorporated in said blades in order to oppose centrifugal flap bending moments which may occur in said blades during rotation thereof.

8. The rotor of claim 5 wherein said blades are mounted to said hub in a hingeless fashion and said cone angle is selected from the range of about 45° to 60°.